United States Patent

Uistola

[19]

[11] Patent Number: 5,924,038
[45] Date of Patent: Jul. 13, 1999

[54] METHOD AND APPARATUS TO SPEED UP AUTONOMOUS SYSTEM SELECTION AFTER CALL RELEASE

[75] Inventor: Ari Uistola, Oulu, Finland

[73] Assignee: Nokia Mobile Phones Limited, Espoo, Finland

[21] Appl. No.: 08/857,401

[22] Filed: May 16, 1997

[51] Int. Cl.[6] ...................................................... H04Q 7/20
[52] U.S. Cl. .......................... 455/450; 455/422; 455/426; 455/434; 455/552
[58] Field of Search ..................................... 455/422, 426, 455/434, 462, 465, 515, 552, 553

[56] References Cited

U.S. PATENT DOCUMENTS

| | | | |
|---|---|---|---|
| 5,257,257 | 10/1993 | Chen et al. | 370/18 |
| 5,345,448 | 9/1994 | Keskitalo | 370/95.3 |
| 5,410,733 | 4/1995 | Niva et al. | 455/33.2 |
| 5,483,668 | 1/1996 | Malkamaki et al. | 455/33.2 |
| 5,524,009 | 6/1996 | Tuutijarvi et al. | 370/95.3 |
| 5,664,005 | 9/1997 | Emery et al. | 455/422 |
| 5,675,629 | 10/1997 | Raffel et al. | 455/51.2 |
| 5,732,360 | 3/1998 | Jarett et al. | 455/552 |
| 5,812,951 | 9/1998 | Ganesan et al. | 455/445 |

Primary Examiner—Wellington Chin
Assistant Examiner—Yemane Woldetatios
Attorney, Agent, or Firm—Perman & Green, LLP

[57] ABSTRACT

A method is disclosed for operating a mobile station, the method including a first step of storing information in the mobile station, the stored information indicating a frequency of a digital control channel of at least one public cellular communications system in the vicinity of an autonomous communications system. The stored information further specifies a frequency channel associated with the autonomous communications system. The autonomous communications system is one of a private system or a residential system. A second step is executed upon a termination of a call using an analog voice channel or a digital traffic channel of a public cellular communications system, wherein the mobile station receives a message from the public cellular communications system, the received message including information indicating a frequency of a digital control channel of the public cellular communications system. A third step of the method compares the information of the received message with the stored information to determine if a match exists between the digital control channels. If a match is found to exist, it is determined that the mobile station is operating in a public cellular communications system that is in the vicinity of the autonomous communications system. In this case the mobile station attempts to tune to a control channel of the autonomous wireless communications system, using the stored information that further specifies a frequency associated with the autonomous communications system.

9 Claims, 4 Drawing Sheets

METHOD AND APPARATUS TO SPEED UP AUTONOMOUS SYSTEM SELECTION AFTER CALL RELEASE

FIELD OF THE INVENTION

This invention relates generally to radiotelephones and, in particular, to radiotelephones or mobile stations such as those capable of operation with a cellular network.

BACKGROUND OF THE INVENTION

In modern mobile telecommunications systems a mobile station may have a choice as to whether to operate with a public cellular system or with an autonomous system, such as a private system or a residential system. Typically it will be desirable to operate with a selected autonomous system, which may provide a more favorable rate structure than the public cellular system(s), or that may provide a desired service not offered by the public cellular system(s). A particular autonomous system may be a residential system that serves the user's home, or a system that serves the user's workplace.

One such modern cellular system is referred to as IS-136, which is described in IS-136.1, Rev. A, February 1996, and subsequent updated releases. This system employs Digital Control Channels (DCCHs) that enable a mobile station to gain access to the system. When a mobile station scans for and subsequently monitors a DCCH, it is said to be "camped" on that particular DCCH. Page messages and other information are received from the DCCH.

Defined in this document are Public Service Profiles (PSPs) and Private Operating Frequencies (POFS). Section 6.3.3 describes a Control Channel Reselection procedure, wherein the mobile station measures the signal strength of the serving DCCH, a non-public search (NPS) DCCH, POFs, and all viable neighbor list (NL) entries stored in the mobile station.

Section 6.3.21 defines the criteria for PSP and POF determination. As specified, an autonomous system is a microsystem of Network Type Private and/or Residential that shares frequencies with the cellular network in an operator's SID area. The number of authorized autonomous systems, and their geographic locations, are controlled by the cellular operator. However, there may be a large number of autonomous systems per SID area, and the specific frequencies used by any autonomous system may be dynamic. These factors make it impractical for the cellular network Base Station/Mobile Switching Center/Interworking functions or BMIs to include the DCCHs of autonomous systems as neighbor list entries. The normal reselection procedures based solely on neighbor list entries are therefore supplemented for mobile stations searching for autonomous systems.

A mobile station is specified to store two sets of frequencies for each autonomous system's Private System Identification (PSID) or Residential System Identification (RSID) that it retains in memory. The first set of frequencies correspond to control channels that have been assigned to the cellular network BMIs in the general vicinity of the autonomous system. These frequencies, along with their corresponding Digital Verification Color Code (DVCC), or Digital Color Code (DCC), and System Identification/System Operator Code/Mobile Country Code (SID/SOC/MCC) are referred to as the Public Service Profiles (PSPs) for the autonomous system. The second set of frequencies represent potential operating frequencies of the autonomous system, and are termed the Private operating Frequencies (POFs). A mobile station is defined to allow for the storage of a minimum of four PSPs and four POFs per autonomous system PSID or RSID. The procedure for a mobile station to initialize and update PSPs and POFs is described below.

Each time a mobile station camps on a DCCH, the frequency and DVCC of each stored DCCH PSP are compared to the frequency and DVCC of the current DCCH. If both the frequency and DVCC of any of the stored PSPs match the frequency and DVCC of its current DCCH, then a candidate autonomous system is considered as identified and the mobile station proceeds to examine the supplementary PSP information as follows.

If the SID/SOC/MCC associated with the PSP under consideration corresponds to the PSID/RSID of the candidate autonomous system, the mobile station declares a PSP match. Otherwise, the mobile station declares a PSP mismatch for the PSP under consideration.

Each time a mobile station tunes to the strongest or second strongest dedicated analog control channel (ACC) while performing an Initialization task (see IS-136.2, Section 2.6.1) or optionally an Idle task (see IS-136.2, Section 2.6.2), the frequency, SID and DCC of each stored ACC PSP are compared to the frequency, SID and DCC of this ACC. If both the frequency, SID and DCC of any of the stored PSPs match with the frequency, SID and DCC of the strongest or second strongest dedicated ACC, the mobile station declares a PSP match. Otherwise, the mobile station declares a PSP mismatch for the PSP under consideration.

When a PSP match is declared while on a DCCH, the mobile station adds the POFs of the associated autonomous system to the list of channels identified as requiring measurements (see Section 6.3.3.1). The mobile station then, after an appropriate delay as required for channel measurement purposes (see Section 6.3.3.3), declares a Priority System Condition (see Section 6.2.3) and uses the POFs as the list of reselection candidates. The mobile station also determines the MS-ACC-PWR, RSS-ACC-MIN, SS-SUFF and DELAY (see Section 6.3.3.4.2) for the POFs prior to invoking or while executing the Control Channel Reselection procedure specified in Section 6.3.3. When a PSP match is declared while on an Analog Control Channel (ACC), the mobile station may determine that a DCCH is the preferred service provider, and enter the Control Channel Scanning and Locking State (see Section 6.2.2), using the associated POFs as candidates.

A mobile station is to allow for manual initialization of PSPs and POFs, and is to also allow for automatic initialization of PSPs and POFs upon initial selection of an autonomous system as follows.

(A) Whenever a mobile station camps on a DCCH supporting a Private System Identification (PSID) or Residential System Identification (RSID) that matches a PSID/RSID stored in its memory (see Sections 8.3.4 and 8.3.5), and the Public bit of a Network Type indicator is set to zero, the mobile station updates the PSPs and POFs stored for the corresponding PSID/RSID.

(B) To update the PSPs, the mobile station stores the first four neighbor list entries received within a Neighbor Cell message (see Section 6.4.1.2.1.1) or a Neighbor Cell (Multi Hyperband) message (see Section 6.4.1.2.2.10), that have a CELLTYPE of NON-PREFERRED. The mobile station first examines the Neighbor Cell List (TDMA) information element in an attempt to find four neighbors having a CELLTYPE of NON-PREFERRED. If four neighbors are not found in the Neighbor Cell List (TDMA) information element, the mobile station proceeds to examine the Neighbor Cell List (Other Hyperband) and then the Neighbor Cell List (Analog) information elements for additional neighbors.

(C) To update the POFs, the mobile station stores the first four neighbor list entries received within the Neighbor Cell message (see Section 6.4.1.2.1.1) or the Neighbor Cell (Multi Hyperband) message (see Section 6.4.1.2.2.10), that have a CELLTYPE of PREFERRED or REGULAR. The mobile station only examines the Neighbor Cell List (TDMA) information element in an attempt to find four neighbors having a CELLTYPE of PREFERRED or REGULAR.

(D) Whenever the mobile station stores a new set of PSPs or POFs for a given autonomous system, it deletes the previous PSPs or POFs for that autonomous system.

A disadvantage that results from these procedures, as currently specified, arises for the case of a mobile station that begins a call when located in a public system where there is no autonomous system coverage, and then subsequently moves during the call to an area where there is coverage by an autonomous system. In conventional practice, when the call is terminated DCCH information is provided by the BMI upon release from an analog voice channel or a digital traffic channel. The mobile station uses this information to scan for the DCCH. When located, the mobile station camps on the DCCH, subsequently declares a PSP match, and then starts to measure the POF channels. After a delay, required for channel measurement purposes, the mobile station executes the channel reselection procedure to the POF channel. It can be appreciated that this procedure can cause a significant and user perceptible delay in the mobile station finally camping on the DCCH of the desired autonomous system.

OBJECTS OF THE INVENTION

It is thus a first object of this invention to provide an improved method for performing autonomous system reselection with a mobile station.

It is a further object of this invention to provide a method, and a mobile station constructed to operate in accordance with the method, for receiving a control channel of a desired autonomous system, without first having to receive a control channel of a public system.

SUMMARY OF THE INVENTION

The foregoing and other problems are overcome and the objects of the invention are realized by methods and apparatus in accordance with embodiments of this invention.

A method of this invention is disclosed for operating a mobile station, the method including a first step of storing information in the mobile station, the stored information indicating a frequency of a digital control channel of at least one public cellular communications system in the vicinity of an autonomous communications system. The stored information further specifies a frequency channel associated with the autonomous communications system. The autonomous communications system, in a presently preferred embodiment of this invention, is one of a private system or a residential system.

A second step of the method is executed upon a termination of a call using an analog voice channel or a digital traffic channel of a public cellular communications system, wherein the mobile station receives a message from the public cellular communications system, the received message including information indicating a frequency of a digital control channel of the public cellular communications system.

A third step of the method compares the information of the received message with the stored information to determine if a match exists between the digital control channels. If a match is found to exist, it is determined that the mobile station is operating in a public cellular communications system that is in the vicinity of the autonomous communications system. In this case the mobile station attempts to tune to a control channel of the autonomous wireless communications system, using the stored information that further specifies a frequency associated with the autonomous communications system. If a match is not found to exist, the method includes a step of tuning the mobile station to the digital control channel of the public cellular communications system, using the information of the received message, and camping on the digital control channel.

For a case where the mobile station is not successful in attempting to tune to the control channel of the autonomous communications system, the method includes a step of tuning the mobile station to the digital control channel of the public cellular communications system, using the information of the received message, and camping on the digital control channel.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
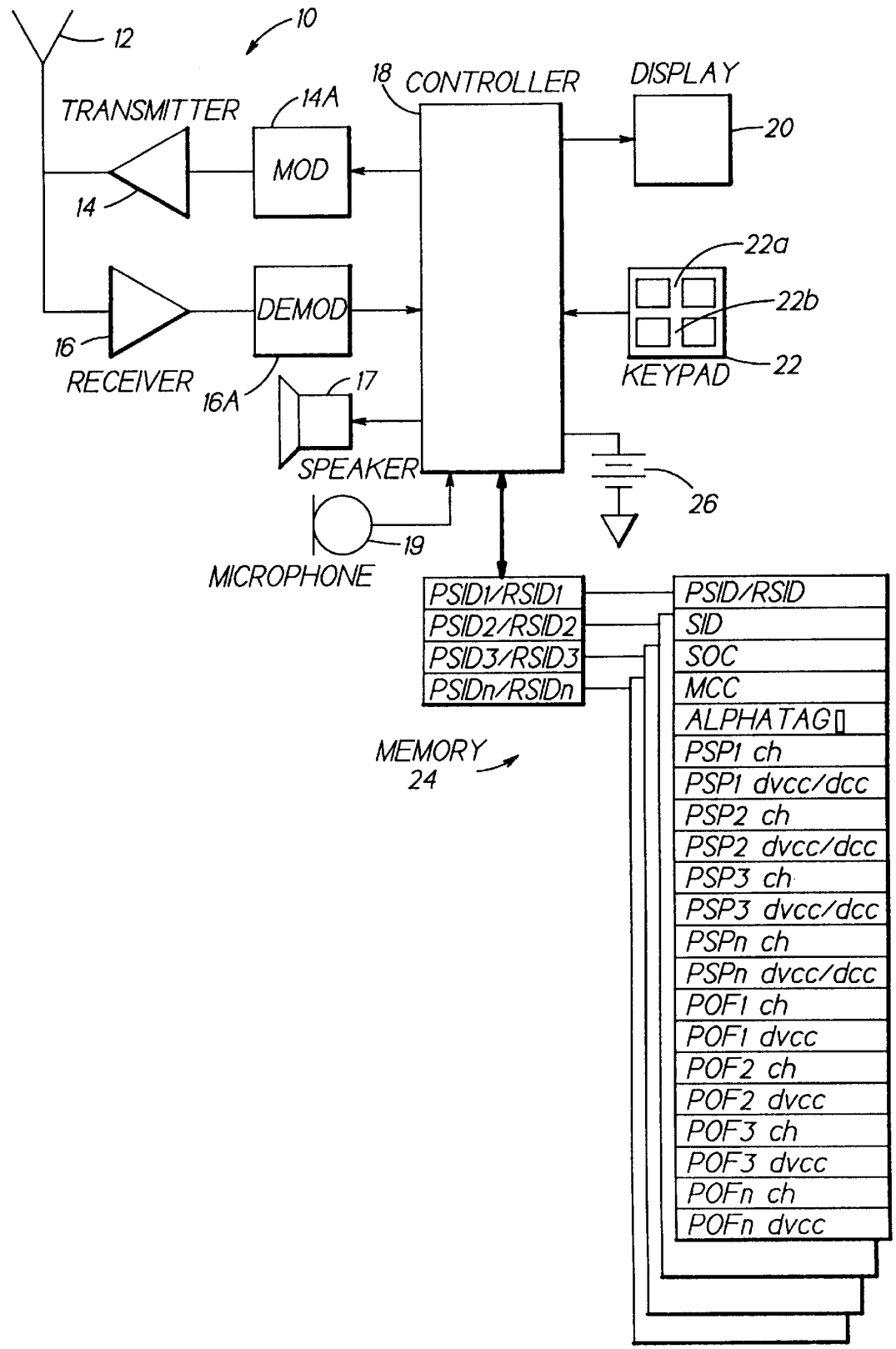
FIG. 1 is a block diagram of a mobile station that is constructed and operated in accordance with this invention.
Figure 2:
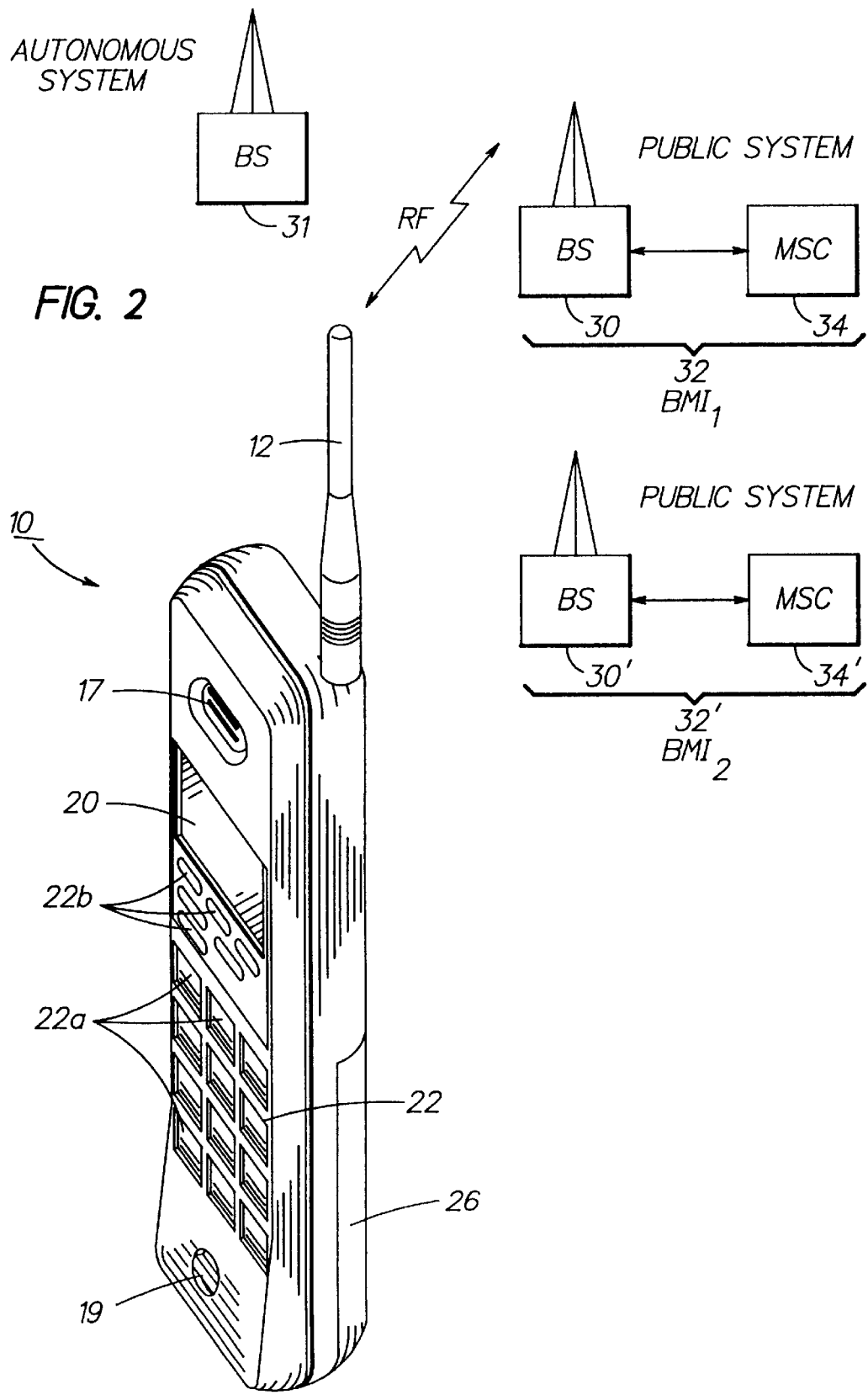
FIG. 2 is an elevational view of the mobile station shown in FIG. 1, and which further illustrates a plurality of cellular communication systems to which the mobile station can be bidirectionally coupled through wireless RF links.

Reference is first made to FIGS. 1 and 2 for illustrating a wireless user terminal or mobile station 10, such as but not limited to a cellular radiotelephone or a personal communicator, that is suitable for practicing this invention. The mobile station 10 can be a vehicle mounted or a handheld device. The mobile station 10 includes an antenna 12 for transmitting signals to and for receiving signals from a first base site or base station 30. The base station 30 is a part of a first cellular public system comprising a BMI ($BMI_1$) 32 that includes a mobile switching center (MSC) 34. The MSC 34 provides a connection to landline trunks when the mobile station 10 is involved in a call.

FIG. 2 also shows a second $BMI_2$ 32', having associated base station(s) 30' and MSC 32'. By example, the $BMI_1$ 32 may be associated with a first digital public system (e.g., PCS1900 or GSM), and $BMI_2$ 32' may be associated with a second public system, such as analog system or another digital system. If the two or more public systems are not the same (e.g., both digital TDMA systems that use the same air interface), then the mobile station 10 is assumed to have at least dual mode capability (e.g., digital TDMA and AMPS) so that it can operate in the different types of public systems.

FIG. 2 further illustrates a base station 31 that is associated with an autonomous or private system, such as a residential system.

The mobile station 10 of FIG. 1 includes a transceiver comprised of a modulator (MOD) 14A, a tuneable transmitter 14, a tuneable receiver 16, a demodulator (DEMOD) 16A, and a controller 18 that provides signals to and receives signals from the transceiver. These signals include signalling information in accordance with the air interface standard of the applicable cellular system, and also user speech and/or user generated data. As was indicated above, the transmitter, receiver, modulator and demodulator may be at least dual-mode capable, and may operate with the frequencies, modulation type, access type, etc. of several of the various public and private systems in the environment of the mobile station 10.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station 10.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 also stores various PSPs (i.e., PSP1–PSPn), and also POFs (i.e., POF1–POFn), as described above. The stored PSPs and POFs are utilized by the method described below in FIG. 4.

The operating program stored in the memory 24 may include routines to present messages and message-related functions to the user on the display 20, typically as various menu items. The memory 24 also includes routines for implementing the method described below in relation to FIG. 4.

Figure 3:
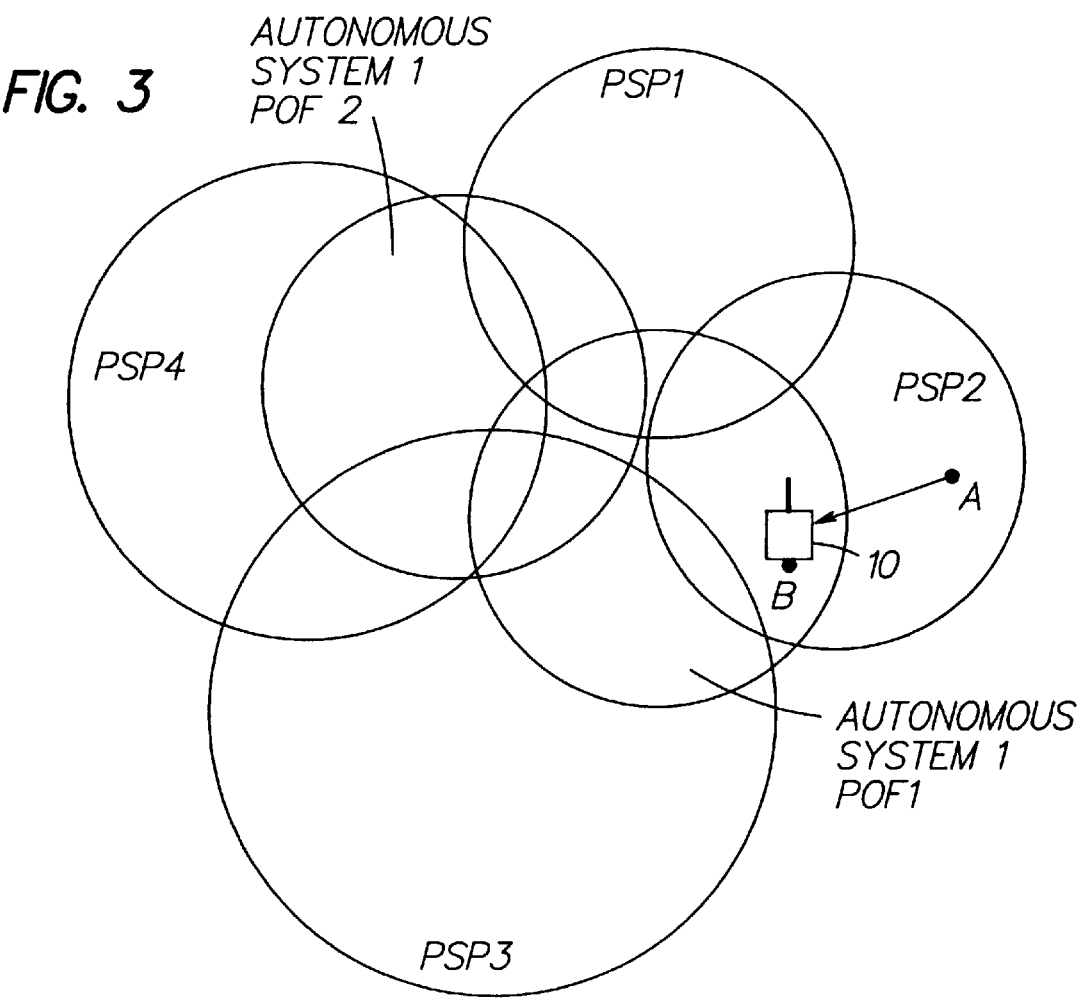
FIG. 3 illustrates several exemplary public system and autonomous system coverage areas, and a mobile station located at call termination within overlapped coverage areas.

Reference is first made to FIG. 3, which illustrates four overlapping public system coverage areas identified by their associated Public Service Profiles (PSPs 1–4). Also shown is the coverage area of one autonomous system with two channels, identified by their respective overlapping Private Operating Frequencies (POF1 and POF2). Each autonomous system may have up to four POFs. In FIG. 3 the coverage areas are idealized as being circular. In practice the coverage areas would have different shapes, depending on, by example, the nature of the terrain and the presence of RF obstructions.

In FIG. 3 the mobile station 10 is shown as being located within the coverage area of the public system associated with PSP2, as well as being within the coverage area of the autonomous system associated with POF1. For this example it is assumed that the mobile station 10 started a call when located at point A (not within the coverage area of the autonomous system associated with POF1), and then subsequently moved during the call to the point B, where the call was terminated. As was indicated previously, in conventional practice, when the DCCH information is provided by the BMI upon release from an analog voice channel or a digital traffic channel, the mobile station 10 uses this information to scan for the DCCH. When located, the mobile station 10 camps on the DCCH, subsequently declares a PSP match, and then starts to measure the POF channels. After a delay, required for channel measurement purposes, the mobile station 10 executes a reselection procedure to the POF channel. It can be appreciated that this procedure can cause a significant delay in the mobile station 10 camping on the desired POF channel.

Figure 4:
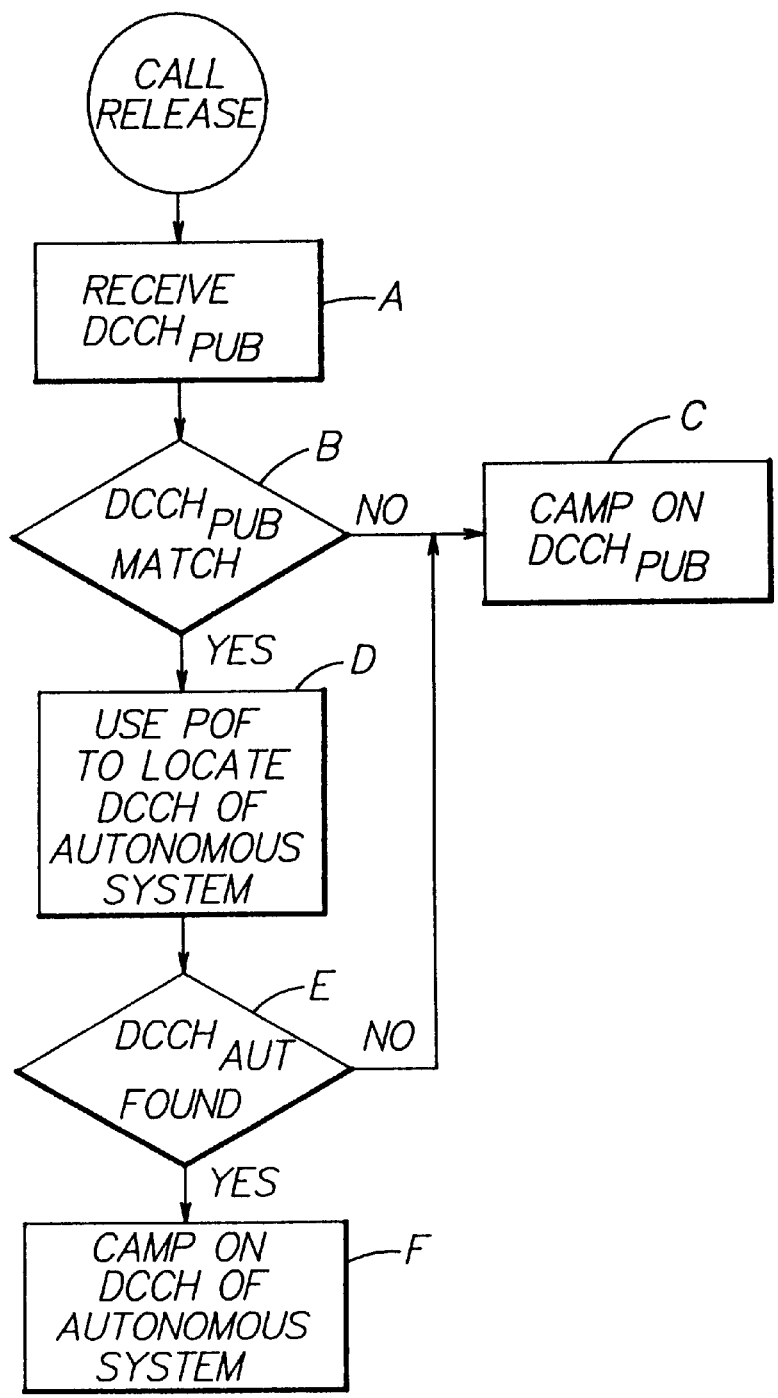
FIG. 4 is a logic flow diagram illustrating a presently preferred method for performing autonomous system reselection with the mobile station illustrated in FIGS. 1–3.

In accordance with this invention, and referring to FIG. 4, upon call release from an analog voice channel or a digital traffic channel the mobile station 10 receives at Block A the DCCH information from the serving public system (e.g., the public system associated with PSP2 in FIG. 3). Reference in this regard can be made to IS-136.2, Rev. A, February 1996, Section 2.6.4.5 (Release) and Section 2.6.5.5 (Release).

It is assumed that prior to this time the mobile station 10 has operated in, and received and stored in the memory 24, autonomous system information from the autonomous system associated with POF1, the information including one or more POFs of the autonomous system and also PSPs that are associated with public systems in the vicinity of the autonomous system. The information thus includes, for example, the PSPs 1–4 and associated parameters, as shown in FIG. 1.

At Block B, and in accordance with this invention, the mobile station 10 compares the DCCH information received from the public system associated with PSP2 to the DCCH information, and possible also the DVCC information, stored in the memory 24 for the PSPs 1–4. If a PSP match is not found, then the mobile station 10 enters Block C, where it scans for and camps on the DCCH of the public system indicated in the call release message. However, if a PSP match does occur at Block B, it is indicated that the mobile station 10 is in a public system that is in the vicinity of the desired autonomous system associated with POF1. That is, the mobile station 10 may be also within the coverage area of the desired autonomous system. In this case control passes to Block D where the mobile station 10 tunes to the indicated POF(s) in order to locate the control channel or DCCH of the desired autonomous system. If the DCCH of the desired autonomous system is found at Block E, the mobile station 10 then executes the Control Channel Selection procedure to determine if the DCCH of the autonomous system is acceptable. Assuming that it is found to be acceptable, the mobile station 10 camps on the $DCCH_{AUT}$ of the autonomous system at Block F, which is the desired result. If the DCCH is not found at Block E, or is determined not to be acceptable (e.g., the mobile station 10 is out of range of the neighboring autonomous system and the signal strength is low, or the autonomous system is not operational), then control passes to Block C to scan for and camp on the DCCH of the public system ($DCCH_{PUB}$) that was received in the call release message at Block A.

Although described in the context of preferred embodiments, it should be realized that a number of modifications to these teachings may occur to one skilled in the art. By example, the teaching of this invention is not limited for use only with systems constructed and operated in accordance with IS-136, or only with digital TDMA cellular systems.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising steps of:

storing information in the mobile station, the stored information indicating a frequency of a control channel of at least one public wireless communications system in the vicinity of an autonomous wireless communications system, the stored information further specifying a frequency channel associated with the autonomous wireless communications system;

upon a termination of a call in a public wireless communications system, receiving a message from the public wireless communications system, the received message including information indicating a frequency of a control channel of the public wireless communications system;

comparing the information of the received message with the stored information to determine if a match exists between the control channel frequencies; and if a match is found to exist, attempting to tune the mobile station to a control channel of the autonomous wireless communications system, using the stored information that further specifies a frequency associated with the autonomous wireless communications system.

2. A method as in claim 1, wherein if a match is not found to exist, the method includes a step of attempting to tune the mobile station to the control channel of the public wireless communications system, using the information of the received message.

3. A method as in claim 1, wherein for a case where the mobile station is not successful in attempting to tune to the control channel of the autonomous wireless communications system, the method includes a step of attempting to tune the mobile station to the control channel of the public wireless communications system, using the information of the received message.

4. A mobile station, comprising:

a RF transceiver for bidirectionally communicating with base stations of public and autonomous communications systems;

a memory for storing information, the stored information indicating a frequency of a control channel of at least one public communications system in the vicinity of an autonomous communications system, the stored information further specifying a frequency channel associated with the autonomous communications system; and a controller coupled to an output of said transceiver and to said memory, said controller being responsive to a termination of a call in a public communications system, for receiving a message from the public communications system through said transceiver, the received message including information indicating a frequency of a control channel of the public communications system;

said controller operating under the control of a stored program in said memory for accessing said memory to compare the information of the received message with the stored information to determine if a match exists between the control channel frequencies, and, if a match is found to exist, for attempting to tune said transceiver to a control channel of the autonomous communications system, using the stored information that further specifies a frequency associated with the autonomous communications system.

5. A mobile station as in claim 4, wherein if a match is not found to exist, said controller instead operates to tune said transceiver to the control channel of the public communications system, using the information of the received message.

6. A mobile station as in claim 4, wherein for a case where the mobile station is not successful in attempting to tune to the control channel of the autonomous communications system, said controller instead operates to tune said transceiver to the control channel of the public communications system, using the information of the received message.

7. A method for operating a mobile station, comprising steps of:

storing information in the mobile station, the stored information including at least one Public Service Profile (PSP) for indicating a frequency of a digital control channel of a public cellular communications system in the vicinity of an autonomous communications system, the stored information further specifying at least one Private Operating Frequency (POF) for indicating a frequency channel associated with the autonomous communications system, the autonomous communications system being one of a private system or a residential system;

upon a termination of a call using an analog voice channel or a digital traffic channel of a public cellular communications system, receiving a message from the public cellular communications system, the received message including information indicating a frequency of a digital control channel of the public cellular communications system;

comparing the information of the received message with the stored PSP information to determine if a match exists at least between the digital control channel frequencies; and if a match is found to exist, determining that the mobile station is operating in a public cellular communications system that is in the vicinity of the autonomous communications system, and attempting to tune the mobile station to a control channel of the autonomous wireless communications system, using the stored POF information.

8. A method as in claim 7, wherein if a match is not found to exist, the method includes a step of tuning the mobile station to the digital control channel of the public cellular communications system, using the information of the received message, and camping on the digital control channel.

9. A method as in claim 7, wherein for a case where the mobile station is not successful in attempting to tune to the control channel of the autonomous communications system, the method includes a step of tuning the mobile station to the digital control channel of the public cellular communications system, using the information of the received message, and camping on the digital control channel.

* * * * *